(12) United States Patent  (10) Patent No.: US 7,825,821 B2
Luechinger et al.  (45) Date of Patent: Nov. 2, 2010

(54) HOLDING RACK FOR DOSAGE UNITS WITH AN ACTIVE USER-GUIDING MEANS

(75) Inventors: Paul Luechinger, Uster (CH); Matthias Gietenbruch, Buchs (CH)

(73) Assignee: Mettler-Toledo AG, Greifensee (CH)

( * ) Notice: Subject to any disclaimer, the term of this patent is extended or adjusted under 35 U.S.C. 154(b) by 299 days.

(21) Appl. No.: 12/101,246

(22) Filed: Apr. 11, 2008

(65) Prior Publication Data

US 2008/0262651 A1   Oct. 23, 2008

(30) Foreign Application Priority Data

Apr. 23, 2007 (EP) .................................. 07106744

(51) Int. Cl.
   *G08B 5/00*   (2006.01)
(52) U.S. Cl. .............................. 340/815.4; 340/309.16; 340/693.5; 340/572.1; 340/572.4; 340/572.7; 141/102; 141/104; 141/331; 141/346; 222/55; 222/75; 222/77; 222/131; 222/325
(58) Field of Classification Search .............. 340/815.4, 340/309.16, 693.5, 572.1, 572.4, 572.7; 141/102, 141/104, 331, 346; 222/55, 75, 77, 325, 222/131
See application file for complete search history.

(56) References Cited

U.S. PATENT DOCUMENTS

| 5,143,210 | A | | 9/1992 | Warwick et al. |
|---|---|---|---|---|
| 5,525,304 | A | | 6/1996 | Matsson et al. |
| 5,752,621 | A | * | 5/1998 | Passamante ................... 221/13 |
| 5,971,594 | A | * | 10/1999 | Sahai et al. .................. 700/242 |
| 6,352,861 | B1 | | 3/2002 | Copeland et al. |
| 6,387,330 | B1 | | 5/2002 | Bova et al. |
| 6,432,359 | B1 | | 8/2002 | Carey et al. |
| 6,674,022 | B2 | * | 1/2004 | Fermier et al. ................. 177/60 |
| 2003/0183642 | A1 | * | 10/2003 | Kempker, Sr. .................. 221/2 |
| 2006/0137760 | A1 | * | 6/2006 | Dubois et al. ................... 141/1 |
| 2007/0006942 | A1 | | 1/2007 | Pluvinage et al. |

FOREIGN PATENT DOCUMENTS

JP   2006-30170 A   2/2006

* cited by examiner

*Primary Examiner*—Tai T Nguyen
(74) *Attorney, Agent, or Firm*—Standley Law Group LLP

(57) ABSTRACT

A holding rack (101, 201, 301, 401) has individual positions or compartments for dosage units (102, 102', 202, 302). Each of the dosage units has a supply receptacle (104, 104', 204, 304) and a dispensing head (103, 103', 203, 303) that are connected to each other. The holding rack (101, 201, 301, 401) is equipped with a means for active user guidance (105, 105', 210, 305) which, in a process of dispensing measured substance quantities from the different dosage units into a receiving container (411), directs the user in taking out and returning the different dosage units that are seated in the holding rack.

17 Claims, 5 Drawing Sheets

HOLDING RACK FOR DOSAGE UNITS WITH AN ACTIVE USER-GUIDING MEANS

CROSS-REFERENCE TO RELATED APPLICATIONS

This application claims a right of priority under 35 USC §119 from European patent application 07106744.1, filed 23 Apr. 2007, the content of which is incorporated by reference as if fully recited herein.

TECHNICAL FIELD

The disclosed device relates to a laboratory setup with a holding rack for dosage units (i.e. substance receptacles with attached dispensing heads for pulverous substances) which is equipped with an active user-guiding means that directs the user in a sequence of taking out and returning the different dosage units that are seated in the rack, e.g. for preparing a mixture, where it is of critical importance that none of the dosage units are accidentally either taken out more than once or overlooked in the preparation of the mixture.

BACKGROUND OF THE ART

The application envisioned for the disclosed device is mainly for manually performed procedures in which an operator takes each individual dosage unit out of a holding rack and places it into a dispensing setup, typically a dosage-dispensing setup that couples to a shutter- and/or feeder element in the dispensing head of the dosage unit to deliver a measured quantity of powder from the dosage unit into a receiving container. The manual process of taking dosage units from the rack and placing them in the dispensing setup involves the risk of operator errors for example if a plurality of different powders are to be dispensed sequentially into the same receiving container. If, for example, the user accidentally dispenses a dose of powder twice from the same container, the resulting mixture in the receiving container will have the wrong mix ratio.

The process of mixing substances in this manner is used for example for standards for the calibration of HPLC (High Performance Liquid Chromatography) instruments which has to be performed in accordance with regulatory requirements. Such standards are mixtures of different pulverous substances which, as a rule, are mixed together and dissolved in an appropriate solvent right before they are used, because if the individual components were kept in a mixed state and/or solved over a longer storage time period a destruction reaction could take place.

Therefore, in view of the need to prepare mixtures of different powders in a laboratory and to avoid the risk of operator errors of accidentally dispensing the same powder dosage component into the batch twice or forgetting a component, the object is to provide a laboratory setup with a holding rack for dosage units which has a degree of intelligence which ensures that each dosage component is dispensed into the target batch only once and no dosage component is accidentally omitted from the target batch.

SUMMARY OF THE INVENTION

This objective is met by a laboratory setup, comprising a processor unit and a holding rack for dosage units, wherein a dosage unit can occupy an individual position or compartment of the holding rack. The laboratory setup is equipped with a respective communication path or interface connection between the processor unit and the holding rack. The holding rack is equipped with an active user-guiding means which is controlled by the processor based on a procedure which is stored in a memory unit of the processor unit, to direct the user in taking out and returning the different dosage units that are seated in said holding rack.

The term "dosage unit" in the present context means a dispensing head with a supply receptacle for a pulverous substance. In the dispensing position of the dosage unit, the dispensing head is arranged below the supply receptacle. To dispense substance from the dosage unit, the latter is coupled to a dosage-dispensing device, i.e. an actuator device which by means of a coupling engages and actuates a discharge control element of the dispensing head, whereby substance is dispensed from a discharge orifice of the dispensing head into a receiving container (also referred to as target container) which is set up below the dosage unit, for example on the weighing pan of an analytical balance. Typically in this kind of a dispensing setup, the weighing signal from the balance is fed back to a processor unit or computer which controls the actuator device which through the aforementioned coupling actuates the discharge control device to control the rate of substance delivery and to stop the delivery when a target weight has been reached.

For the smallest substance quantities, it is possible to use a dosage unit which does not have a vial or flask connected to the dispensing head as a supply receptacle. The passage in the dispensing head which otherwise serves for the connection to the vial or flask is in this case used to hold the small supply of substance, i.e. this passage in itself now forms the supply receptacle, and the dosage unit therefore consists of the dispensing head alone. A plug or cap closes the receptacle cavity in the dispensing head after it has been filled with substance.

In a process of manually preparing a mixture of different powder substances, the operator will place the dosage units with the different substances one after another into the aforementioned dispensing setup to dispense the prescribed substance quantities into the target container. To assist the operator in this process, the inventive concept of a holding rack with a user-guiding means can be put into practice in the embodiments that will now be described.

In a first embodiment of a laboratory setup, the holding rack in which the dosage units occupy individual positions in a straight row has a means of indicating to the operator which dosage unit is called for in the current step of the dosage-dispensing process. This indication can for example consist of indicator lights arranged on the holding rack above each of the respective holding positions for the dosage units. The light that belongs to the dosage unit for the current step of the procedure is for example lit up while the other lights remain dark, or the dosage unit of the current step may be identified by a green light, while the lights at the other dosage units are red.

A holding rack of a laboratory setup according to a second embodiment has a means of locking all dosage units in place in their seating positions in the holding rack, and unlocking only the dosage unit that is called for in the current step of the dosage-dispensing process.

A holding rack of a laboratory setup according to a third embodiment is configured as a carousel where the dosage units are arranged around the circumference. The stepwise rotation of the carousel is programmed so that the dosage unit for the current step is turned towards the user. In this case, the unit to be used in the current step is indicated to the user through its position on the carousel. As an advantageous addition, this carousel rack could be equipped with the aforementioned locking feature whereby all dosage units are locked into their seating positions in the carousel, and only the dosage unit in the position for the current step of the dosage-dispensing process is unlocked. To give an example, the locking feature could be realized with a stationary cover over the carousel preventing access to all dosage units on the carousel except for an access window or cutout in the stationary cover giving access to the one dosage unit which has been moved to the cutout window by the carousel for the current dispensing step.

In a basic version of each of the three embodiments described above, the dosage units are arranged in the rack in the order in which they are used in the dispensing process, for example from left to right in a linear rack or clockwise in a carousel rack. Thus, if the substances need to be dispensed from the dosage unit in a specified sequence, the dosage units have to be set into the rack in the prescribed order before the dispensing process is started.

Advantageously, the holding rack of the laboratory setup further comprises for each indicator light a push button and an indicator device for representing specific data related to the dosage unit and/or related to the specific data of the substance inside said dosage unit, for which the related push button has been operated. Said indicator device could be a screen or a touch screen. The representation of the data can be performed in many ways, even the data of all dosage units could be represented, in example in a scroll up menu. Typical specific data related to the dosage unit could be the number of already performed dispensings as well as the remaining quantity of powder. Typical specific data related to the substance could be the chemical formula, the date of production and the lifetime of the substance as well as the dangerous substance class.

In further developed embodiments, the dispensing head of each dosage unit carries an identification ("ID") tag, for example a barcode or matrix-code label or in particular an RFID (Radio Frequency Identification) tag or label, also known as transponder tag. In the latter case, the holding rack is advantageously equipped with a reader device, so that the dosage unit in each rack position can be identified by a processor unit that is incorporated in the rack or connected to the holding rack as an external processor unit, for example a computer or the processor unit of a dispensing setup. As a minimum, this ID tag identifies the substance in the dosage unit, but it can also include additional information such as the total amount of substance stored in the dosage unit and the date when the dosage unit was last filled, as well as an expiration date for the substance currently contained in the dosage unit. With an appropriate program and database in the processor unit that controls the rack and/or in a central computer to which the processor unit is connected, it is possible to control and manage an entire inventory of dosage units and their contents.

The last-mentioned concept of using I.D. tags on dosage units as part of an inventory management system provides not only a systematic control over inventory processes such as reordering of supplies, discarding substances that are past their expiration dates, refilling of dosage units, etc., it can also serve for the control of substances that are regulated under the law (highly toxic substances, prescription drugs, etc.). The control could be exercised for example by requiring a user to be registered electronically on the system before the aforementioned locking feature will unlock any dosage units from their seats in the rack, and by keeping track of the date and time when a dosage unit was taken from the rack and returned to the rack.

Advantageously, the aforementioned processor or I.D. tag, attached on the holding rack, the dosing head or on a receiving container includes a memory unit in which a procedure is stored which gives the substance quantities and the order of sequence in which they are to be dispensed from their respective dosage units. With the rack position of each dosage unit being known to the processor from the aforementioned transponder tags, and with the dispensing procedure being stored in the memory unit, the processor is able to activate the indicating lights and/or release the locks and/or set the carousel positions according to the prescribed sequence of dosage units. Consequently, it is unnecessary for the dosage units to be set in the rack in any particular order.

Furthermore, if the number of different substances—and accordingly the number of dosage units—used in the preparation of a mixture exceeds the number of holding positions in a single rack, arrangements are possible where one processor unit addresses dosage units that are arranged in more than one rack. This includes the singular case where the "rack" is a container that holds only one dosage unit. In this case, any mixing procedure will involve a plurality of containers. Applying the afore-described inventive concepts to this situation leads to an arrangement where:

each container of an individual dosage unit has a means of identification (e.g., an RFID tag, barcode label, etc.) whereby the dosage unit is made recognizable to a processor or computer;

there is a means of two-way communication between the container on the one hand and the processor or computer on the other;

each container of an individual dosage unit is equipped with an indicating means such as an indicating light, which is controlled by the processor or computer; and each container of an individual dosage unit is equipped with a locking feature that keeps the dosage unit locked into the container except when the lock is released through a signal from the processor unit.

This concept is considered particularly advantageous for mixing procedures that involve hazardous substances where the entire batching procedure should be handled with a completely enclosed setup inside a glove box. In this case, the dosage units have to be placed into the glove box inside their safety containers. The foregoing concept of treating the containers themselves as "single-unit racks" eliminates the steps of transferring the dosage units from their individual safety containers into a rack and later returning them to the safety containers, which are much more cumbersome to perform inside a glove box.

As a further developed version of this last concept, a plurality of containers, each holding one dosage unit, can be placed on and connected to a base plate or shelf plate (not shown in the drawings), for example with mechanical and electrical plug connections which on the one hand secure each container to its assigned place on the base plate and on the other hand provide the electrical connections for the indicator lights as well as for the release of the locking devices that hold the dosage units locked in the containers. Having the containers secured on a shelf plate or other kind of holding base has the advantage that a dosage unit can be pulled out of its safety container with one hand while the container stays in its place on the support base. This simplifies the manipulation in particular inside a glove box.

Finally, in a further extension of the inventive concept, the means of indication could be incorporated in the dispensing head of the dosage unit instead of on the rack or individual container. The indicator (e.g. an indicator light on the dispensing head) could be energized through electrical contacts in the rack, or by means of a small battery in the dispensing head, or the small amount of energy required for the indicator light (for example a light-emitting diode) could also be received inductively by the dispensing head through a coil or antenna.

BRIEF DESCRIPTION OF THE DRAWINGS

Details of the holding rack as disclosed are presented in the description of the embodiments illustrated in the drawings, wherein identical parts are identified by identical reference numbers and wherein.

DETAILED DESCRIPTION OF THE DRAWINGS

Figure 1A:
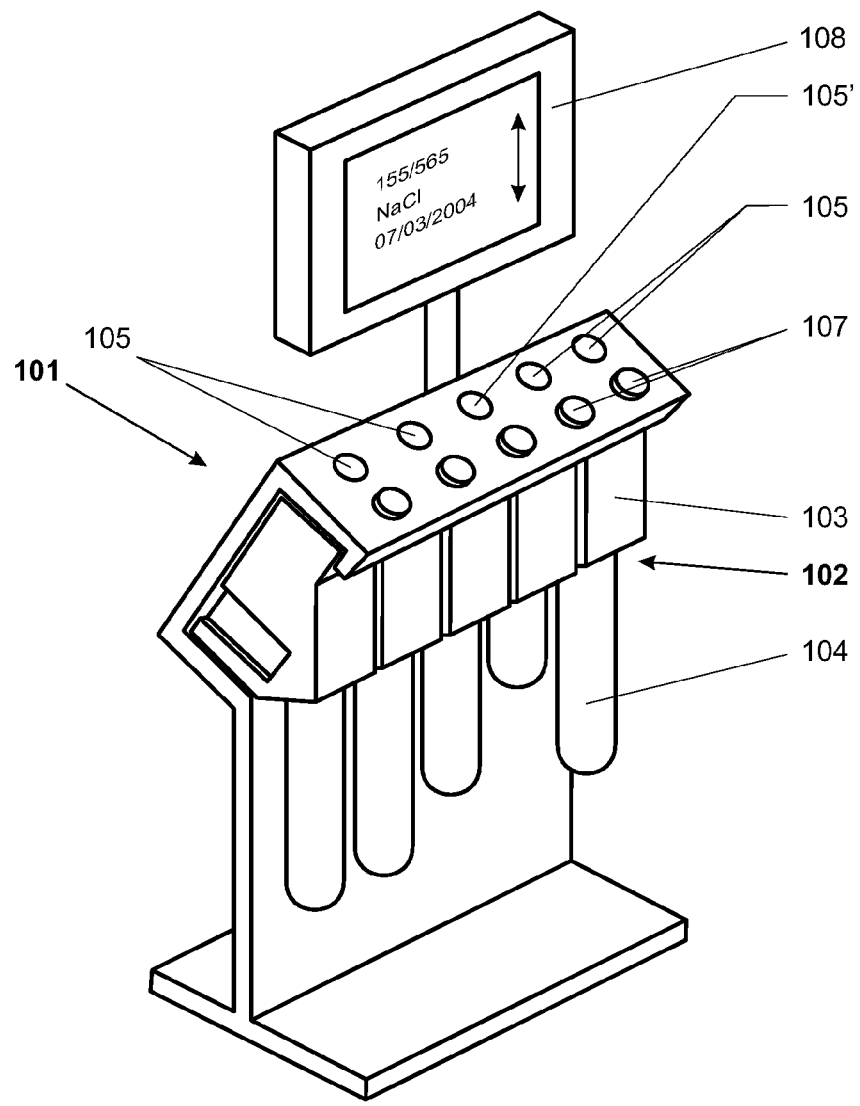
FIG. 1a is a three-dimensional view of a first embodiment linear rack filled with dosage units.
Figure 1B:
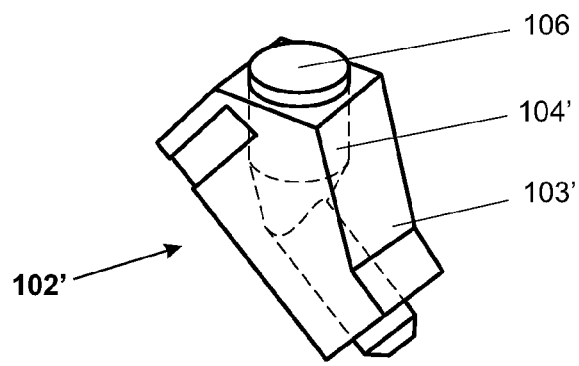
FIG. 1b is a dosage unit where the supply receptacle is a cavity inside the dispensing head.

The linear holding rack 101 according to a first embodiment as shown in FIG. 1a is filled with dosage units 102, where each dosage unit 102 consists of a supply receptacle 104 in the form of a vial with a dispensing head 103 connected to it. As shown in FIG. 1b, the dispensing head 103 alone without a vial can be used as dosage unit 102' for very small substance quantities. The opening in the dispensing head 103' where otherwise the neck of a vial would be connected serves in this case as supply receptacle 104'. After the dosage unit 102' has been filled with substance, the opening is closed off with a plug or cap 106.

The dosage units 102, 102' can be taken out of the holding rack 101 by swiveling the bottom of a dosage unit forward from the rack, and the reverse sequence of movements is used to return a dosage unit to the rack. An indicator light 105, 105' is arranged above each seating position in the holding rack. In a batching process where different substances have to be dispensed from the individual dosage units into a receiving container, the dosage unit 102, 102' to be taken out of the holding rack 101 for the next dispensing step is indicated by the light 105' in the respective position being lit up while the other lights 105 remain dark, or the light 105' that belongs to the dosage unit for the current dispensing step lights up in a first colour, e.g. green, while the lights 105 at the other dosage units light up in a second colour, e.g. red.

The holding rack 101 further comprises for each indicator light 105, 105' a push button 107 and an indicator device 108 for representing specific data related to the dosage unit 102 and/or related to the specific data of the substance inside said dosage unit 102 for which the related push button 107 has been manually operated. Said indicator device 108 could be a screen or a touch screen. The representation of the data can be performed in many ways, even the data of all dosage units 102, 102' could be represented, in example in a scroll up menu.

Figure 2:
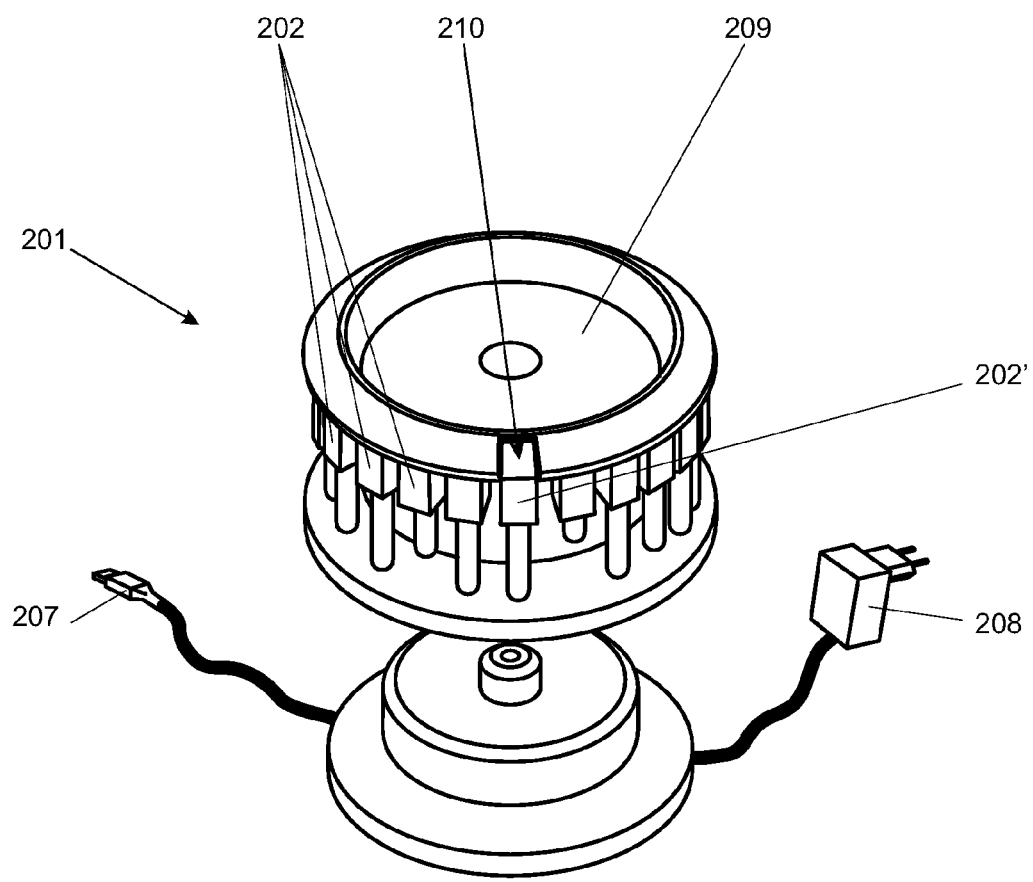
FIG. 2 is a three-dimensional view of a carousel rack, according to a third embodiment, filled with dosage units, as well as a possibility of locking the dosage units according to a second embodiment.

FIG. 2 shows a holding rack 201 where the positions for the dosage units 202 are arranged on a carousel. The carousel, which has a drive mechanism energized by a power supply 208, rotates to a position facing the user where the particular dosage unit 202' to be taken out next in the batching process step presents itself to the user. The concept of a carousel rack 201 also offers the possibility to lock all dosage units 202 into their seating positions in the rack except said particular dosage unit 202'. This can be realized by arranging a stationary i.e., non-rotating, bell cover 209 over the top of the carousel which extends downward over the dosage units far enough to keep all dosage units 202 captive except for said next dosage unit 202', which is made accessible by a cutout 210 at the front of the bell cover 209.

In the holding racks 101 or 201 of FIGS. 1a and 2, respectively, the dosage units 102, 102', 202 can be arranged in the rack in the order in which they are used in the dispensing process, requiring the operator to set the dosage units into the rack in the prescribed order before the dispensing process is started, for example from left to right in the case of the holding rack 101 or clockwise in the case of the holding rack 201. In the dispensing process, the holding rack then turns on the indicator lights or changes the carousel positions in the corresponding sequential order.

In a more advanced version of the inventive concept the holding rack 201 includes a reader device for electronically readable I.D. labels, for example RFID tags, transponder tags, barcodes, etc., which are affixed to the dosage units 202. The holding rack 201 has a bidirectional first interface connection 207 to a processor unit (see FIG. 4, reference symbol 414), and the dosage units 202 carry transponder tags, whereby the processor unit is enabled to identify each dosage unit 202 and to send control commands to the holding rack 201 to move the dosage units 202 to the "take-out" position at the cutout 210 in any order prescribed by a program in the processor, so that the dosage units 202 do not need to be in sequential clockwise or counterclockwise order in the carousel rack 201.

Of course, an electronic reader device connected to a processor can be used analogously with the holding rack 101 of FIG. 1a, where the processor would send the respective command signals to the indicator lights.

Figure 3A:
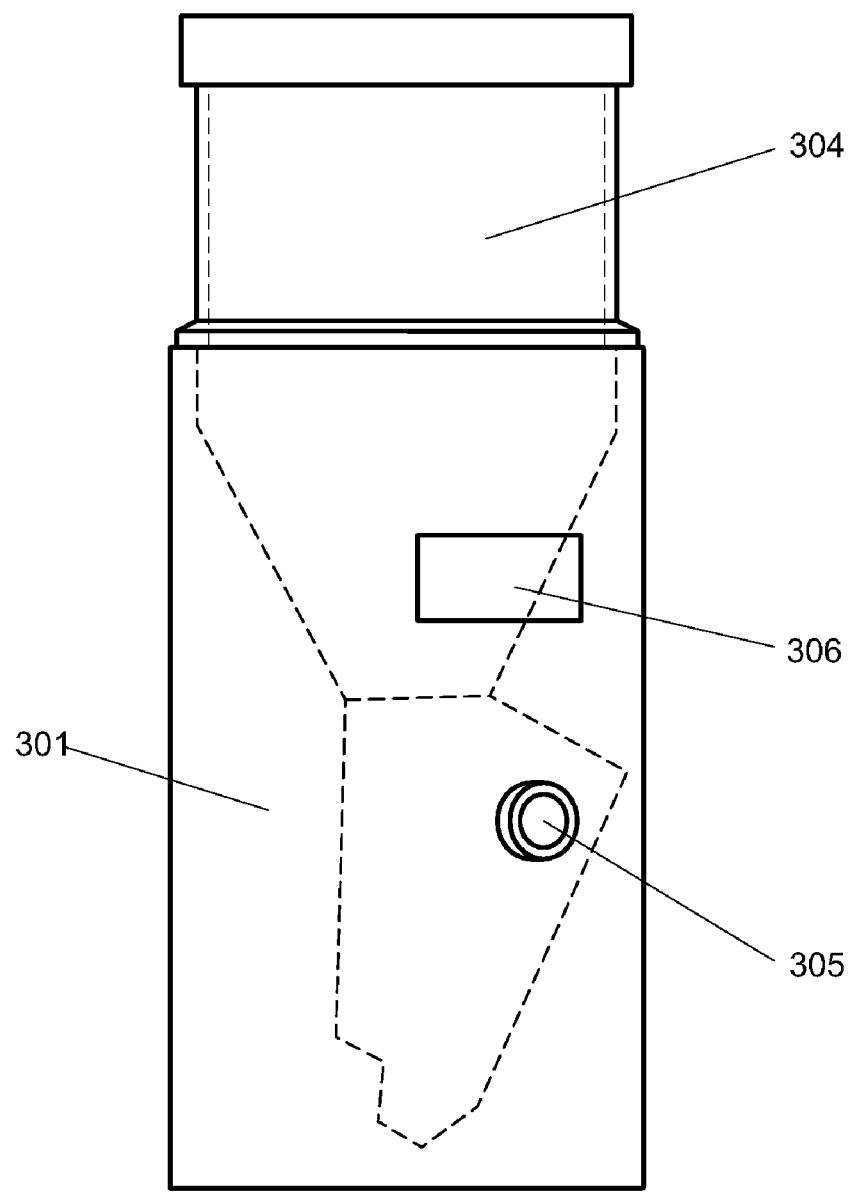
FIG. 3a is a single-unit holding rack or container unit, comprising a fourth embodiment.
Figure 3B:
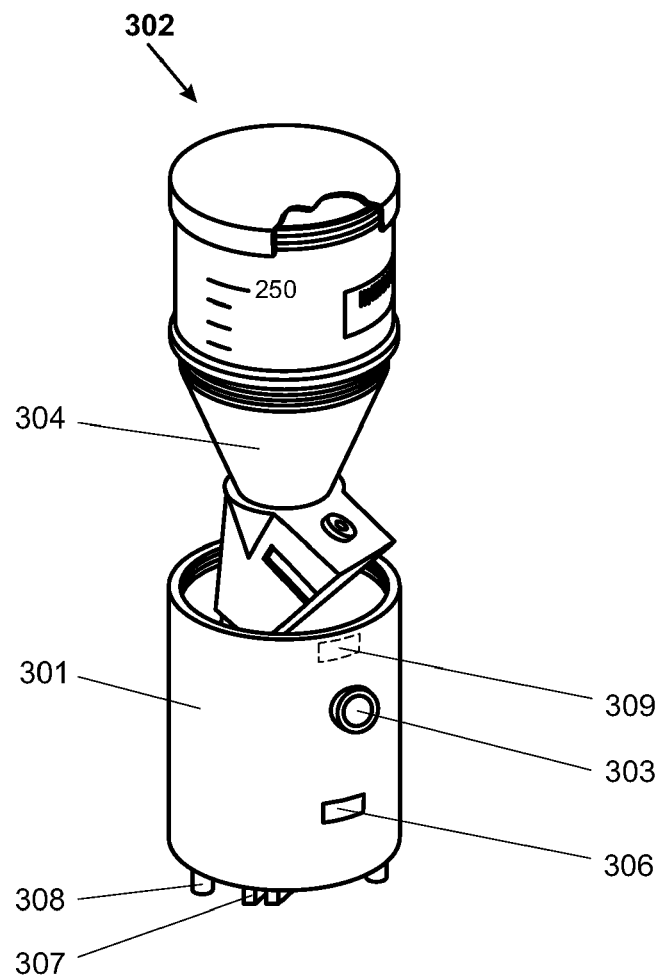
FIG. 3b is the dosage unit of FIG. 3a being lifted out of its enclosure unit.

FIGS. 3a and 3b illustrate the singular case of a holding rack 301 in the form of a container that holds only one dosage unit 302. To illustrate another possible design of a dosage unit, the supply receptacle 304 is funnel- or hopper-shaped, open on top to fill in the substance and then closed with a cap. In a mixing procedure, a plurality of holding containers 301 are used to hold the dosage units 302. Each container 301 has an indicator light 305 and an electronically readable I.D. label 306, and all of the containers used in the process are interfaced to a common processor unit preferably through a wireless connection. The information on the I.D. label on each container is entered into the processor unit by means of an electronic reader device, and the processing unit, in turn, controls the indicator lights 305 on the holding containers 301. The indicator light 305 as well as the I.D. label 306 could also be arranged on the dosage unit 302 instead of on the container 301. In either case, the small amount of power required for the indicator light could be supplied by a battery or transmitted inductively through an RF antenna incorporated in the container 301 or the dosage unit 302.

The concept of a safety container functioning as a single-unit rack is particularly advantageous for mixing procedures that involve hazardous substances where the entire batching procedure has to be handled with a completely enclosed setup inside a glove box. If traces of the hazardous substance remain clinging to the outside of the dispensing head after a step in the batching procedure has been completed, the risk that the substance could escape into the environment is prevented by the holding container or safety container 301. Of course, it is also possible to arrange a multi-unit rack 101, 201 according to FIG. 1 or FIG. 2 inside a glove box and to transfer the dosage units from their safety containers to the multi-unit rack 101, 201 in the glove box. However, this takes up more space inside the glove box and adds the steps of transferring the dosage units between their safety containers and the holding rack 101, 201.

Figure 3C:
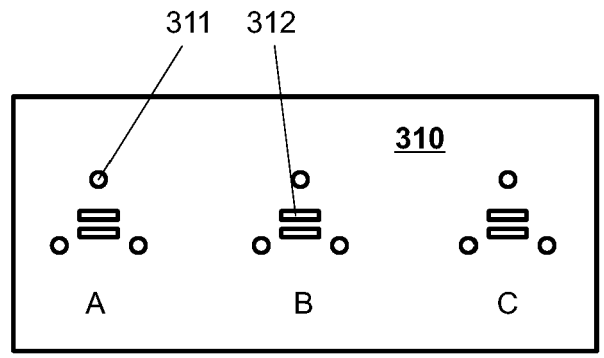
FIG. 3c is a base plate or shelf plate for three single-unit racks.

In a further developed embodiment of the foregoing concept, a plurality of containers 301, each holding one dosage unit 302, can be placed on and connected to a base plate or shelf plate. As an example FIG. 3c shows a base plate or shelf plate 310 with three seating positions A, B, C for containers 301. The feet 308 of a container 301 plug or snap into matching openings 311 on the base plate 310, and electrical contact elements 307 on the container 301 meet electrical contact elements 312 on the base plate 310. The electrical contacts 307, 312 provide the electrical connections to the indicator lights 305 as well as to the locking devices 309. In its default condition, the locking device 309 keeps the dosage unit 302 locked into the safety container 301, and releases the lock only when it is energized through the electrical contacts 307, 312 under the control of a processor unit. Thus, a dosage unit 302 can be pulled out of its respective safety container 301 with one hand while the container 301 stays in its place on the tray, which simplifies the manipulation in particular inside a glove box.

Figure 4:
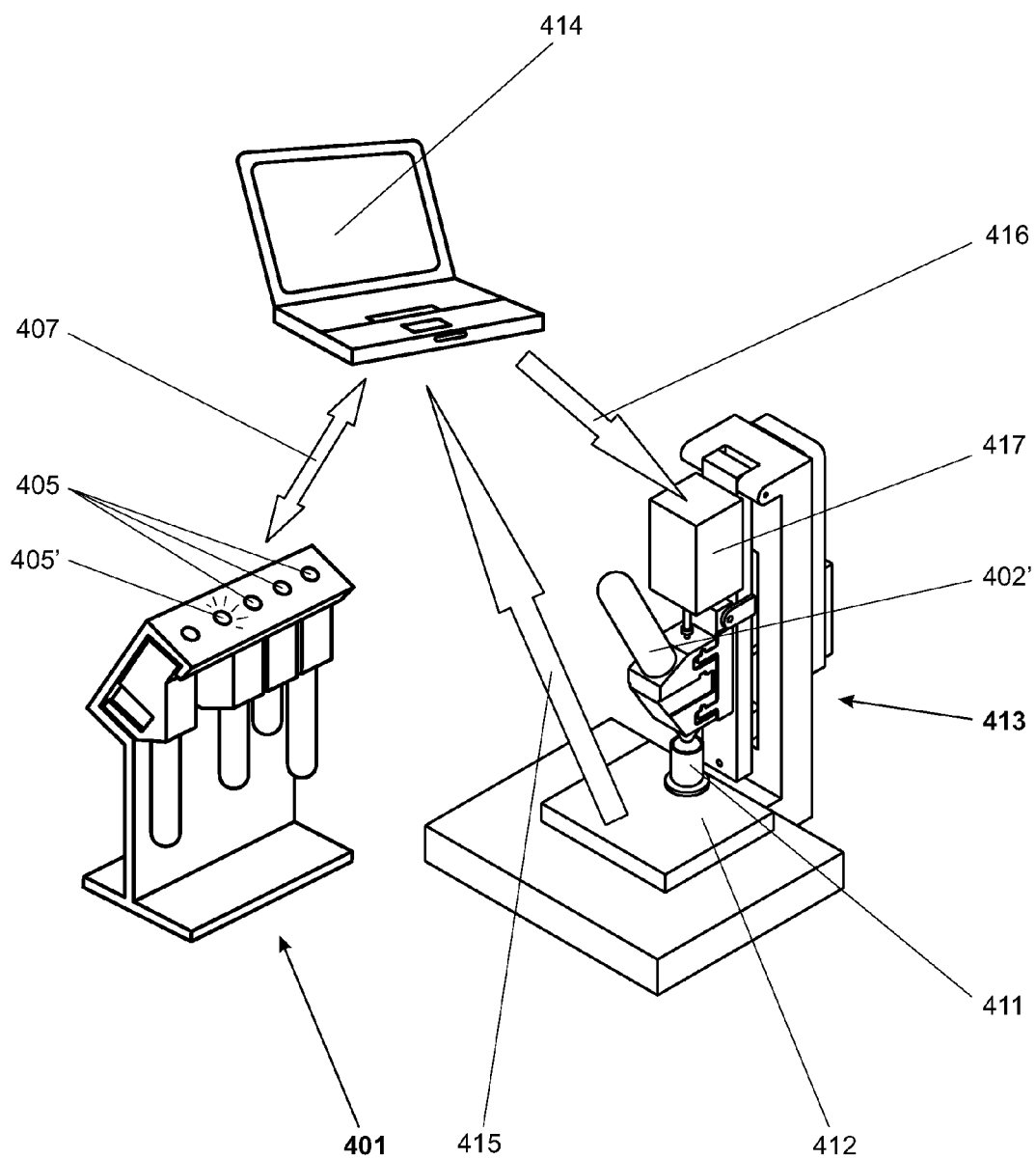
FIG. 4 is a typical laboratory setup with the holding rack for dosage units, a laboratory balance with a dosage-dispensing device, a computer, and the respective communication paths between computer and rack as well as between computer and balance/dosage-dispensing device.

FIG. 4 schematically illustrates a typical laboratory setup with a holding rack 401 (without push buttons and display) for dosage units, a laboratory balance 413 with a dosage-dispensing device 417, a computer or processor unit 414, and the respective communication paths 407 between computer and holding rack, 415 between computer and balance, and 416 between computer and dosage-dispensing device. A dosage unit 402' whose indicator light 405' is lit up has been taken out of the holding rack 401 and coupled to the dosage-dispensing device 417 to dispense substance into a receiving container 411 resting on a weighing pan 412. Through the interface connection 407, the computer receives the substance data from the RFID tags on the dosage units and controls the indicator lights based 405 on a procedure stored in the computer. The balance sends weight data to the computer through the signal connection 415. The computer, through the interface connection 416, controls the speed and the shut-off point of the dosage-dispensing device 417 in accordance with a weight target given in the aforementioned procedure.

The embodiments presented herein illustrate holding racks and dosage units with different configurations and features. While some of the different configurations and features have not been explicitly shown in combination with all of the embodiments in which they could advantageously be used, such combinations will be readily apparent to a person skilled in the art and are therefore included in the scope of the invention.

What is claimed is:

1. A laboratory setup for actively guiding a user in manually dispensing at least one substance in a currently-selected step of a substance-dispensing process, comprising:
   a processor unit having a memory unit;
   a rack for holding each of the substances, the rack having at least as many individual positions or compartments as there are substances;
   a means for communicating between the processor unit and the holding rack, the communicating means comprising a communication path or an interface connection; and
   a means for actively guiding the user, arranged on the holding rack, the active guiding means being controlled by a procedure stored in the memory unit.

2. The laboratory setup of claim 1, further comprising:
   a dosage unit for each of the substances, each dosage unit comprising a supply receptacle and a dispensing head, wherein either:
       the supply receptacle is a vial-, flask, or hopper-shaped container connected to the dispensing head; or
       the supply receptacle is an open cavity inside the dispensing head, the cavity being closed off with a plug or cap after being filled with the substance.

3. The laboratory setup of claim 2, wherein:
   the active guiding means comprises:
   a means, arranged on each of the dosage units, for visibly indicating to the user which dosage unit is selected for the currently-selected step of the substance dispensing process; and
   a physical or wireless connection for transmitting a signal from the holding rack to the visibly indicating means.

4. The laboratory setup of claim 2, wherein:
   the positions or compartments are arranged on a carousel, and
   the active guiding means comprises a means for rotating the carousel such that the position or compartment associated with the dosage unit selected for the currently-selected step of the substance dispensing process is rotated to a position facing the user.

5. The laboratory setup of claim 4, further comprising:
   a means, on the holding rack, for selectively unlocking the dosage unit selected for the currently-selected step from its respective position or compartment for removal by the user, while selectively locking each other dosage unit into its position or compartment.

6. The laboratory setup of claim 2, wherein:
   the dosage units are arranged in the holding rack in an order corresponding to their use in the dispensing process, requiring the dosage units to be set into the holding rack in the order of use before starting the dispensing process.

7. The laboratory setup of claim 2, further comprising:
   an identification label associated with each dosage unit; and
   a means, on the holding rack, for reading the identification label, and associating each dosage unit and its position or compartment to the processing unit,
   wherein the identification label is selected from the group consisting of: a transponder tag, a RFID tag, a barcode label, and a matrix label.

8. The laboratory setup of claim 7, further comprising:
   a balance, with a weighing pan adapted for placement of a receiving container thereon.
   a dosage-dispensing device, adapted for being selectively coupled to the dosage unit selected for the currently-selected step;
   an interface connection for communicating a weight signal from the balance to the processor unit; and
   an interface connection for communicating substance delivery signals from the processor unit to the dosage-dispensing device.

9. The laboratory setup of claim 7, further comprising:
   an inventory management system for the dosage units and substances contained therein, the inventory management system integrated with the identification labels, the reader device, and the processor unit.

10. The laboratory setup of claim 9, further comprising:
an access control and surveillance system for preventing unauthorized use of the dosage units and of the substances contained therein, the access control and surveillance system integrated with the identification labels, the reader device, the processor unit and the locking means.

11. The laboratory setup of claim 1, wherein:
the active guiding means comprises a means, arranged on the holding rack, for visibly indicating to the user which dosage unit is selected for the currently-selected current step of the substance dispensing process.

12. The laboratory setup of claim 11, wherein:
the positions or compartments on the rack are arranged in a straight row;
the visibly indicating means comprises indicator lights arranged on the holding rack, above each of the respective positions or compartments, such that at least one of the following occurs:
   the indicator light associated with the dosage unit selected for the currently-selected step of the substance dispensing process is lit up while the other lights remain unlit, or
   the indicator light associated with the dosage unit selected for the currently-selected step of the substance dispensing process is lit up in a first colour while the other lights are lit up in a second colour.

13. The laboratory setup of claim 12, wherein:
the visibly indicating means further comprises, for each indicator light and arranged on the holding rack, a push button and an indicator device;
wherein the indicator device represents specific data related to at least one of: the dosage unit and the substance inside the dosage unit.

14. The laboratory setup of claim 13, further comprising:
an identification label associated with each dosage unit; and
a means, on the holding rack, for reading the identification label, and associating each dosage unit and its position or compartment to the processing unit,
wherein the identification label is selected from the group consisting of: a transponder tag, a RFID tag, a barcode label, and a matrix label.

15. The laboratory setup of claim 1, wherein:
the holding rack comprises a plurality of holding rack units adapted to be combined to act cooperatively under the control of the processor unit, which is incorporated into one of the holding rack units or is externally connected to the holding rack.

16. The laboratory setup of claim 15 wherein
at least one of the holding rack units cooperating as a group is a single-unit rack with only one position or compartment for a dosage unit.

17. The laboratory setup of claim 16, wherein:
the holding rack comprises:
   a plurality of single-unit racks, each single-unit rack having at least one of:
an indicator light and a lock; and
   a base plate or shelf plate, with a mechanical connection for securing each single-unit rack seated thereon or connected thereto in an assigned position and an electrical connection for energizing each indicator light and lock.

* * * * *

UNITED STATES PATENT AND TRADEMARK OFFICE
CERTIFICATE OF CORRECTION

| | | |
|---|---|---|
| PATENT NO. | : 7,825,821 B2 | Page 1 of 1 |
| APPLICATION NO. | : 12/101246 | |
| DATED | : November 2, 2010 | |
| INVENTOR(S) | : Luechinger et al. | |

It is certified that error appears in the above-identified patent and that said Letters Patent is hereby corrected as shown below:

In column 9, lines 10-11, please delete "currently-selected current step" and insert
-- currently-selected step --.

Signed and Sealed this
Fourth Day of January, 2011

David J. Kappos
*Director of the United States Patent and Trademark Office*